United States Patent [19]

Martin

[11] Patent Number: 4,475,701
[45] Date of Patent: Oct. 9, 1984

[54] DEVICE FOR PROTECTING AND COVERING A RAIL FOR FIXING THE SEATS OF A COMMERCIAL AIRCRAFT

[75] Inventor: Gérard Martin, Longpont-sur-Orge, France

[73] Assignee: Société anonyme dite: Tissmetal Lionel-Dupont, Lyons, France

[21] Appl. No.: 491,417

[22] Filed: May 4, 1983

[30] Foreign Application Priority Data

May 18, 1982 [FR] France .................................. 82 08666

[51] Int. Cl.³ .............................................. B64D 11/06
[52] U.S. Cl. .................................. 244/118.6; 74/566; 308/3.5; 410/115
[58] Field of Search ............... 244/118.1, 118.5, 118.6, 244/122 R; 410/115, 105; 52/716–718, 710; 297/344; 74/566; 89/36 L; 49/504; 308/3.5; 248/503, 503.1, 429

[56] References Cited

U.S. PATENT DOCUMENTS 220,269 10/1879 Boyd ...................................... 74/566
1,037,631 9/1912 Jones ................................... 89/36 L
3,565,153 2/1971 Loos et al. ............................ 308/3.5
4,089,140 5/1978 McIntyre et al. ................. 244/118.6
4,213,593 7/1980 Weik .................................... 410/105

FOREIGN PATENT DOCUMENTS 2458462 1/1981 France .............................. 244/118.6

Primary Examiner—Galen L. Barefoot
Attorney, Agent, or Firm—McAulay, Fields, Fisher, Goldstein & Nissen

[57] ABSTRACT

This device is provided for protecting and covering a rail for fixing the seats of a commercial aircraft equipped with a device for automatically varying the pitch of the seats, the feet of the seats being fast with bases connected by connecting laths. A long upper rail cover, of width greater than that of the rail, totally covers the rail and is in contact, by its longitudinal edges, with the floor carpet. This rail cover is fast with the seat connecting lath, and horizontal blades fast with each base of a foot extend longitudinally over a certain length under the rail cover, between the latter and the connecting lath, to form, with this rail cover, a telescopic assembly and thus to cover the whole of the rail between the rear foot of one seat and the front foot of the following seat.

8 Claims, 5 Drawing Figures

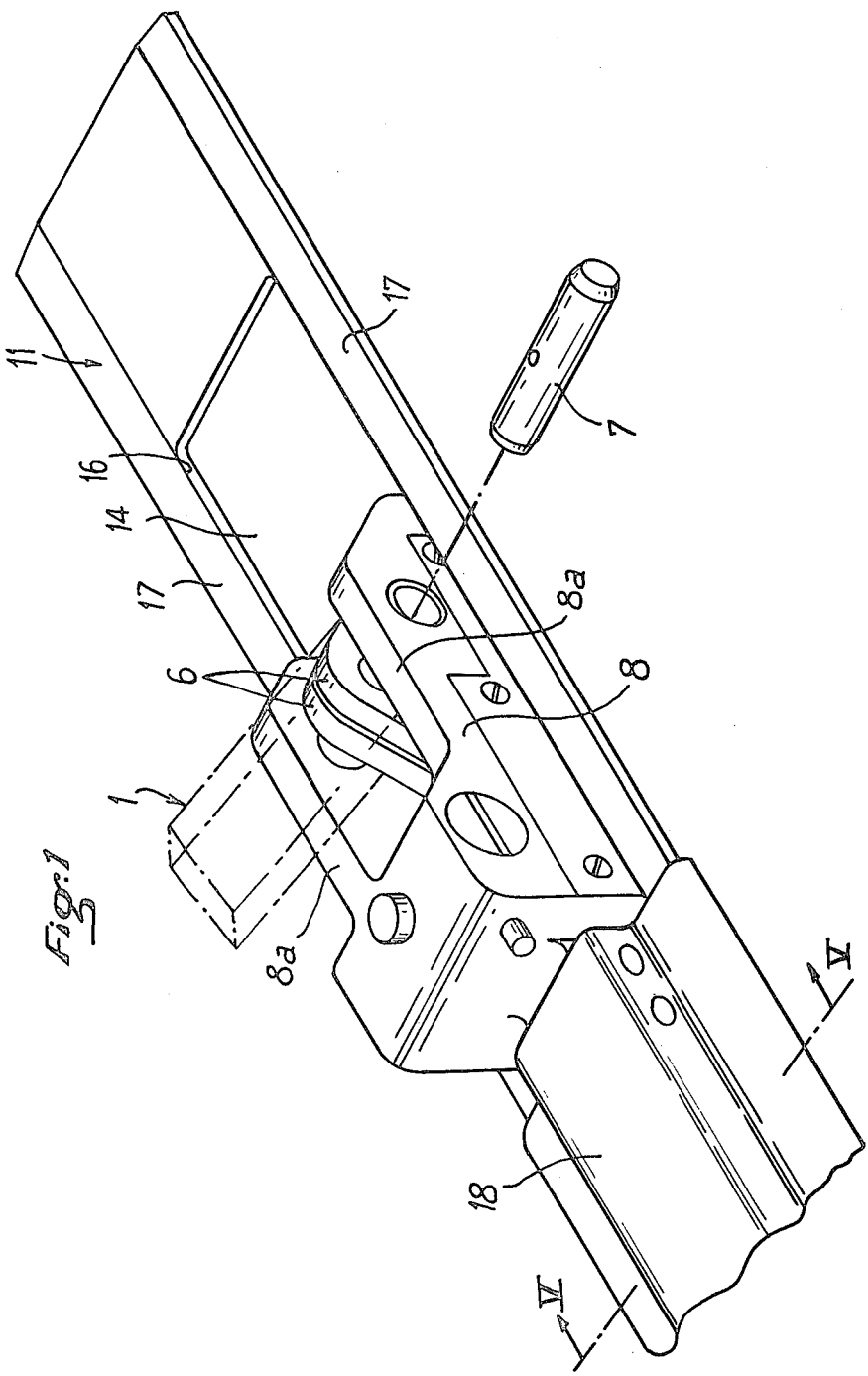

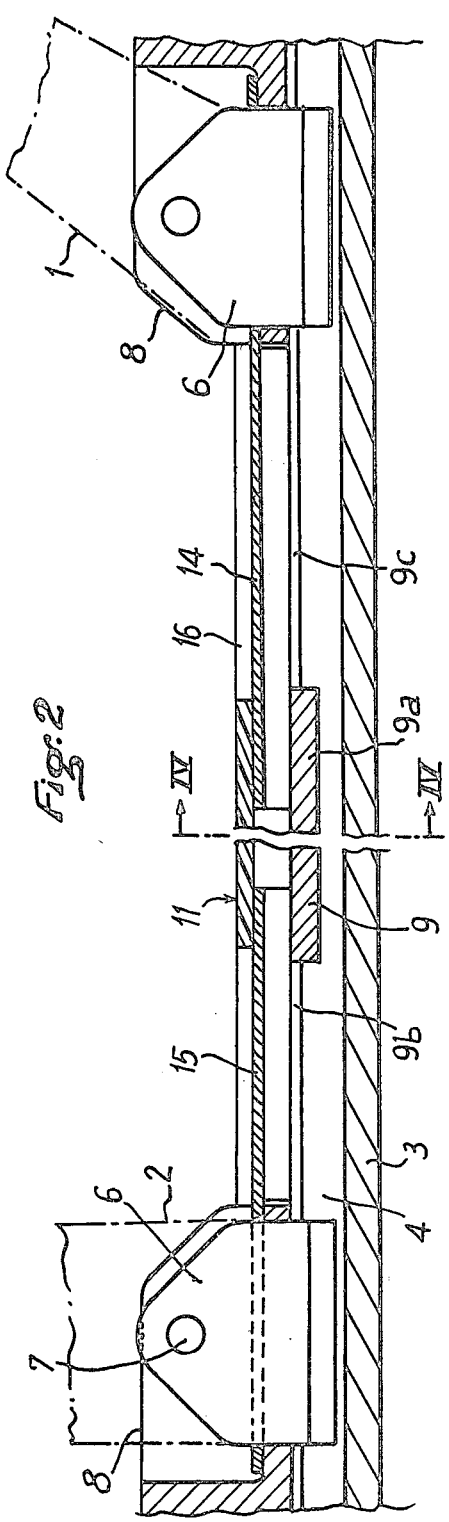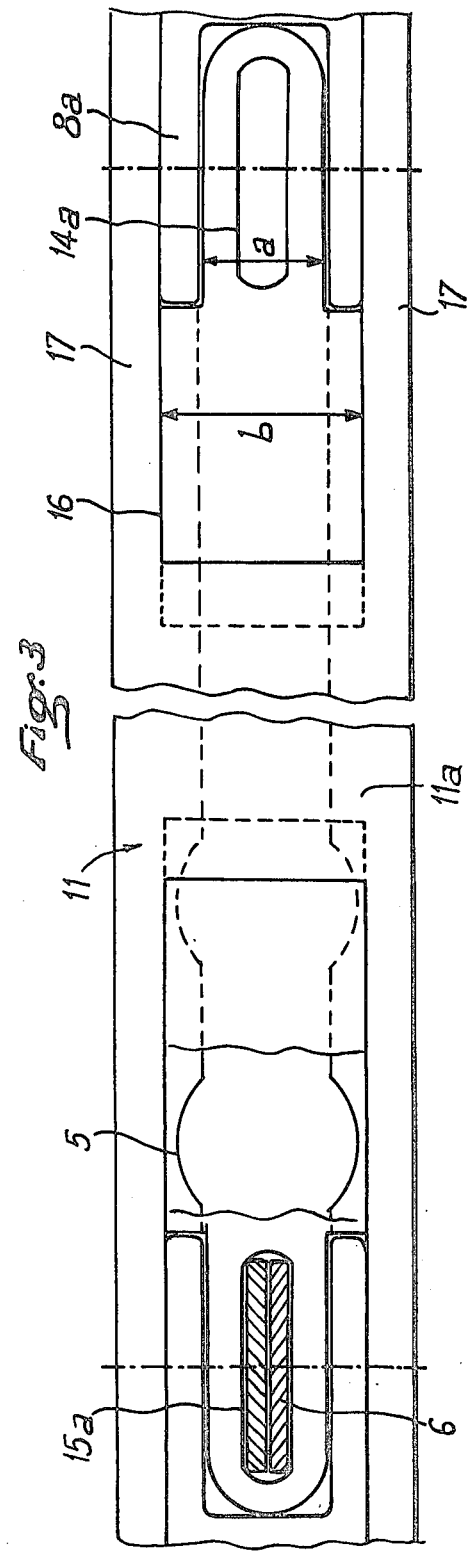

DEVICE FOR PROTECTING AND COVERING A RAIL FOR FIXING THE SEATS OF A COMMERCIAL AIRCRAFT

BACKGROUND OF THE INVENTION

The present invention relates to a device for protecting and covering a rail for fixing the seats of a commercial aircraft equipped with a device for automatically varying the pitch of the seats.

It is usual, in conventional seat installations on board a commercial aircraft, to cover the floor rails on which the seats are fixed, by covers constituted by long pieces having a cross section adapted to the inner profile of the rails so as to hook thereon and of which the dimensions in length depend on the distance left free by the implantation of the seats, between the rear foot of one seat and the front foot of the following seat. It is also known to vary the "pitch" of the seats, i.e. the distance therebetween, by means of an automatic motorized device actuating a set of laths connecting the front feet of one seat and the rear feet of the following seat. Such a device is described in the U.S. Patent Application Ser. No. 477,245 filed on Mar. 21, 1983 as Continuation-in-Part Application of the former Application Ser. No. 156,327 filed on June 4, 1980. It is therefore obvious that, in the event of such a pitch varying device being provided in a commercial aircraft, the conventional rail covers, of predetermined lengths, present the drawback of having to be replaced by others, whenever the pitch is changed, so as to cover the spaces left free on the rails by the new configuration of the seats.

SUMMARY OF THE INVENTION

It is an object of the present invention to remedy this drawback by providing very simple means which automatically adapt to the length required by a new configuration of the seats, without it being necessary to make manual adjustment.

To this end, this device for protecting and covering a rail for fixing the seats of a commercial aircraft equipped with a device for automatically varying the pitch of the seats, said rails presenting, in its upper surface, a groove in which grip fastening members fast with the feet of the seats and preventing detachment thereof whilst allowing them to slide longitudinally, the feet of the seats being fast with bases connected by connecting laths, is characterized in that it comprises a long upper rail cover, of width greater than that of the rail, totally covering the rail and in contact, by its longitudnal edges, with the floor carpet, this rail cover being fast with the seat connecting lath, and horizontal blades fast with each base of a foot extending longitudinally over a certain length under the rail cover, between the latter and the connecting lath, to form, with this rail cover, a telescopic assembly and thus to cover the whole of the rail between the rear foot of one seat and the front foot of the preceding seat.

The device according to the invention ensures protection of the rail against penetration of foreign bodies in the rail, which bodies might impede normal functioning of the motorized pitch varying device.

BRIEF DESCRIPTION OF THE DRAWINGS

The invention will be more readily understood on reading the following description with reference to the accompanying drawings, in which:

FIG. 1 is a view in perspective of part of the device for protecting and covering a rail according to the invention, on either side of a base for fixing a rear foot of a seat.

FIG. 2 is a view in axial and vertical section of the protecting and covering device between the feet of two seats.

FIG. 3 is a plan view of the device.

DESCRIPTION OF THE PREFERRED EMBODIMENTS

Figure 4:
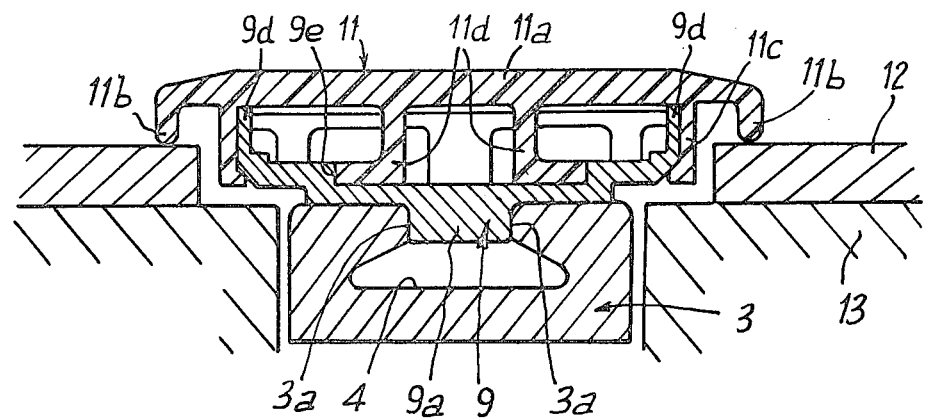
FIG. 4 is a view in vertical and transverse section made along line IV–IV of FIG. 2.
Figure 5:
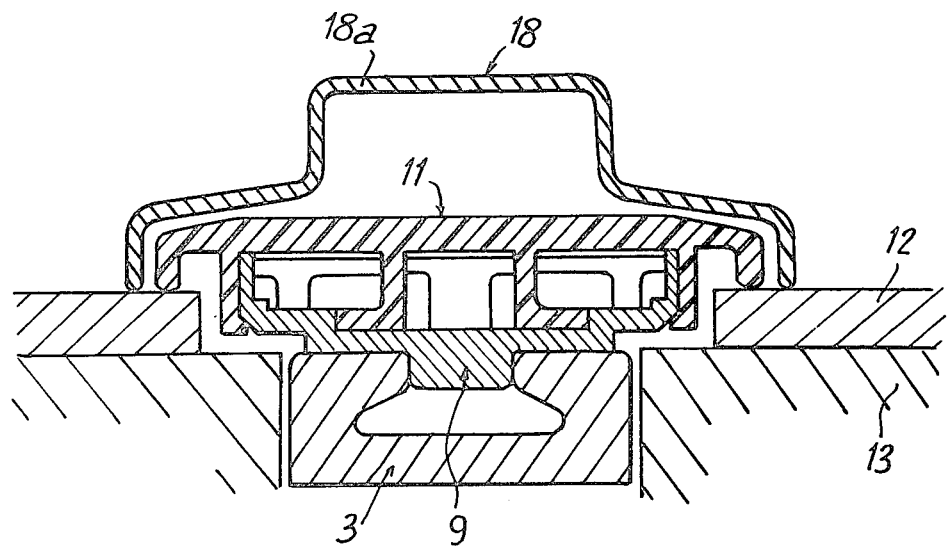
FIG. 5 is a view in vertical and transverse section made at the location of the rod for connecting the two feet of the same seat.

Referring now to the drawings, the device according to the invention is associated with a device for automatically varying the pitch of the seats of a commercial aircraft, such as described in the U.S. Patent Application Ser. No. 477,245. In FIGS. 1 and 2, these seats are shown only by one rear foot 1 and one front foot 2, these two feet being illustrated simply in chain-dotted lines. All the seats of a commercial aircraft are fixed by their feet 1, 2 to longitudinal rails 3 incorporated in the floor of the fuselage and currently presenting, in their upper part, a longitudinal groove 4 of dovetail cross section. At regular intervals, vertical holes 5 are pierced in the inner and upper flanges 3a of the rail 3 which are opposite each other and define the groove 4. Both the front and the rear feet of the seats are fastened by means of two hooks 6 of L-shaped cross section, each of these hooks 6 comprising lower horizontal flange of small width, adapted to engage in the groove 4, and a high vertical flange. The two hooks 6 of each pair are rendered fast with the associated rear foot 1 or front foot 2, by means of a horizontal and transverse pin 7 passing through coaxial holes made in the two hooks 6 and in the lateral and vertical flanges 8a of a base 8 bearing a locking member engaging in the various holes 5 in the rail 3.

The connection between the rear foot 1 of a forward seat and the front foot 2 of a rear seat is effected by means of a connection lath 9 which presents, on either side of a thick median part 9a, two longitudinal oblong openings 9b and 9c which are necessary to allow, on the one hand, unlocking of the seats and, on the other hand, the variation of the pitch between the seats. The median part 9a of the connecting latch 9 is engaged between the two flanges 3a of the rail 3 and slides longitudinally therein, thus ensuring longitudinal guiding. All the elements which have just been described form part of the device for automatically varying the distance between the seats described in the U.S. Patent Application Ser. No. 477,245.

The device for protecting the rail 3 between the rear foot 1 of a forward seat and the front foot 2 of a rear seat comprises a plurality of superposed elements forming a telescopic assembly. This device comprises an upper rail cover 11 which is constituted by a long piece, for example made of plastics material, by extrusion, and which presents a horizontal upper flat part 11a whose width is greater than that of the connecting lath 9. The horizontal upper flat part 11a terminates, along its two longitudinal sides, in two downwardly folded flanges 11b whose lower ends slide on the floor covering 12 lying on the floor 13 of the aircraft and which is interrupted in the zone where the fixing rail 3 is located. The rail cover 11 is rendered fast with the connecting lath 9 by any appropriate means. For example, the rail cover 11 may be assembled with the connecting lath 9 by simple clipping. To this end, it presents two longitudinal side ribs 11c extending downwardly and forming hooks at their ends, which grip on two lateral flanges 9d, extending upwardly, forming part of the connecting lath 9. The assembly of the two pieces 9 and 11 may be completed by providing, in the central part of the rail cover 11, two other longitudinal ribs 11d extending downwardly, in the form of squares, and of which the horizontal arms, extending outwardly, but against inner longitudinal shoulders 9e of the connecting lath 9.

The protecting device further comprises two horizontal blades 14 and 15 which extend longitudinally and are fast, at one of their ends, with the bases 8 of the rear and front feet 1 and 2. The end part of each of the blades 14, 15 which is connected to the base 8, presents a reduced width a so as to engage between the lateral and vertical flanges 8a of the base 8. In addition, it is provided with a longitudinal slot 14a, 15a respectively, to allow the passage of the vertical flanges of the fastening members 6. The rest of each of the blades 14, 15 has a larger width b which is equal to that of a notch 16 which is made longitudinally in the horizontal part 11a, at its two longitudinal ends, of the rail cover 11. Each notch 16 thus defines in the rail cover 11 two lateral tongues 17 which extend along the lateral and vertical flanges 8a, outside these flanges, to engage beneath the feet of the seats.

Beneath each seat is disposed a longitudinal connecting rod 18 which extends between the bases 8 of the rear foot 1 and front foot 2 of the seat and which is fixed to these bases.

From the foregoing description, it is seen that, whatever the value of the pitch, i.e. the distance between the seats, the lower rail 3 is protected against penetration by any foreign body, as it is totally covered by the telescopic assembly constituted by the upper rail cover 11 and the blades 14, 15. The free end part of each of the blades 14, 15 is engaged slightly in the central part of the rail cover 11, which thus ensures continuity of the protection. If the pitch between the seats is reduced, the blades 14, 15 penetrate further inside the rail cover 11 and, on the contrary, they penetrate less if the pitch between the seats is increased.

Under the same seats, the protection of the rail 3 is ensured by the connecting rod 18 which extends between the two bases 8 and which covers the rail 3 permanently. This connecting rod may take any appropriate form: in particular, it may comprise an elevated central part 18a, with a cross section in the form of an upturned U, which is extended by lateral flanges extending to the floor covering 12 and covering the longitudinal end flanges 17 forming part of the rail cover 11.

What I claim is:

1. A device for protecting and covering a rail for fixing the seats of a commercial aircraft equipped with a device for automatically varying the pitch of the seats, said rails presenting, in its upper surface, a groove in which grip fastening members fast with the feet of the seats and preventing detachment thereof whilst allowing them to slide longitudinally, the feet of the seats being fast with bases connected by connecting laths, comprising a long upper rail cover, of width greater than that of the rail, totally covering the rail and in contact, by its longitudinal edges, with the floor carpet, this rail cover being fast with the seat connecting lath, and horizontal blades fast with each base of a foot extending longitudinally over a certain length under the rail cover, between the latter and the connecting lath, to form, with this rail cover, a telescopic assembly and thus to cover the whole of the rail between the rear foot of one seat and the front foot of the following seat.

2. A device according to claim 1, wherein each blade presents, in its end part, a longitudinal opening allowing passage therethrough of the fastening members.

3. A device according to claim 2, wherein the end part of each blade, of width smaller than the width of the rest of the blade, engages between two lateral and vertical flanges of the base connected to the foot of the seat.

4. A device according to claim 3, wherein the rail cover presents, at its two ends, a rectangular longitudinal notch defining two lateral longitudinal flanges extending along the two lateral and vertical flanges of the base, outside said flanges.

5. A device according to claim 4, wherein the two longitudinal and lateral flanges of the rail cover are engaged beneath the lateral parts of a connecting rod extending between the two bases fixed to the feet of the same seat, this rod which covers the rail between these feet, being fixed to the bases.

6. A device according to claim 1, wherein the connection between the rail cover and the connecting lath is made by clipping.

7. A device according to claim 6, wherein the rail cover comprises a horizontal upper part terminating, along its two longitudinal sides, in two downwardly extending flanges, the rail cover further comprising two vertical and longitudinal ribs extending downwardly and forming hooks at their ends, which grip on two lateral flanges extending upwardly, forming part of the connecting lath.

8. A device according to claim 7, wherein the rail cover further comprises, in its central part, two additional longitudinal ribs, extending downwardly, in the form of a square and of which the horizontal arms, extending outwardly, abut against inner longitudinal shoulders of the connecting lath.

* * * * *